C. G. HALLAS, F. W. FLOWER & E. PEARSON.
MANUFACTURE OF BLANKS FOR CUTLERY.
No. 193,115. Patented July 17, 1877.
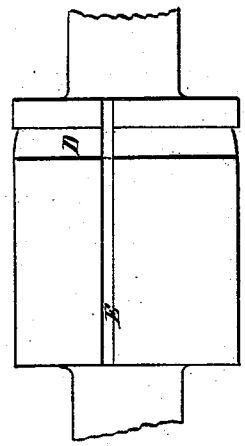
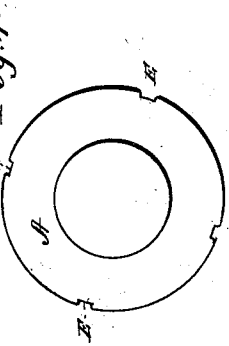
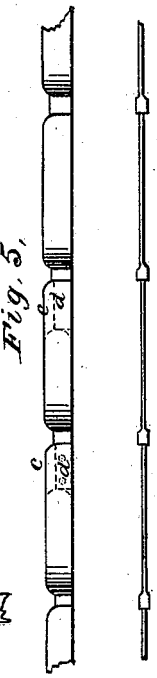
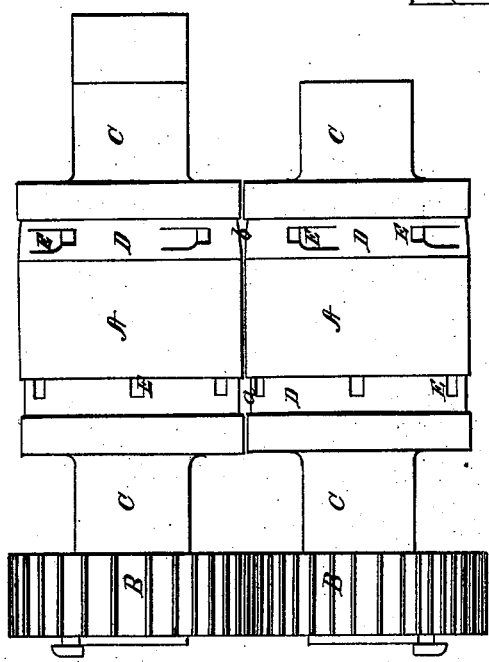
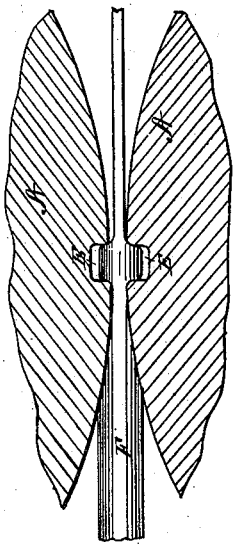
Witnesses
H. R. Eddin.
E. E. Masson
Inventors
Charles Gray Hallas,
Frederick W. Flower, Edward Pearson
by Charles Page
their Atty.

UNITED STATES PATENT OFFICE.

CHARLES G. HALLAS, FREDERICK W. FLOWER, AND EDWARD PEARSON, OF SHEFFIELD, ENGLAND.

IMPROVEMENT IN MANUFACTURE OF BLANKS FOR CUTLERY.

Specification forming part of Letters Patent No. 193,115, dated July 17, 1877; application filed May 15, 1877.

*To all whom it may concern:*

Be it known that we, CHARLES GRAY HALLAS, FREDERICK WILLIAM FLOWER, and EDWARD PEARSON, all of Sheffield, in the county of York, England, have made certain new and useful improvements in rolling steel to be used in the manufacture of cutlery, and other similar articles required with bolsters or shoulders; and we do hereby declare the following to be a full, clear, and exact description thereof, sufficient to enable those skilled in the art to which it appertains to make and use the same, reference being had to the accompanying drawings, which form a part of this specification.

The object of our said invention is to reduce the cost of production of the "rough blanks" of table-cutlery and other similar articles with bolsters or shoulders, by forming the said bolsters or shoulders on such rough blanks during the process of rolling down the steel to the required thickness or size, in lieu of the present method of welding an iron bolster onto a steel blank.

In carrying out our invention in order to effect this object, flat grooves of the required width of the blank are formed round the circumference of either one or both of an ordinary pair of cast-iron chilled rolls, such groove or grooves corresponding to and regulating the thickness of the blank. At one side or edge, or in the bottom of such groove, in the case of rough blanks for table-blades, for example, indentations or counterparts of the bolster or shoulder required are sunk or otherwise formed, at given distances from each other, according to the length required between the bolsters or shoulders, one half of such indentations being formed in the top roll, and the corresponding half formed in the bottom roll.

Referring to the accompanying drawings, in which like letters indicate corresponding parts in all the figures, Figure 1 represents a front elevation of a pair of rolls employed in carrying out our invention. Fig. 2 is a transverse section (drawn to an enlarged scale) of a portion of a pair of rolls of a slightly-modified construction. Figs. 3 and 4 represent, respectively, a front and end elevation of one of the said rolls; and Figs. 5 and 6 represent strips of steel or strings of blanks after leaving the rolls.

A A are two chilled cast-iron rolls, rotating at equal speed by being geared together by the wheels B, keyed or otherwise secured on their axles C C, and each provided with gates or shallow grooves D D in their peripheries, of a width corresponding to the width of a table-knife, for example, and of a depth equal to one-half, or thereabout, of the thickness of the blade or tang. These grooves may be of equal depth throughout, as shown at *a*, for producing blades of rectangular section, or they may be inclined, as shown at *b*, in order to produce blades of a tapering form in section—that is to say, thinner at the edge than at the back. E E are recesses or indentations formed in the bottom of the grooves D, of a shape and size corresponding to one-half of the bolster or shoulder, and that portion of the blade called the "neck," the indentations in the pair of rolls being situated at a distance apart equal to the combined length of the blade and tang of the knife, and so arranged as that the indentation of the one roll shall coincide or come immediately opposite to those of the other roll, in order to form the complete bolsters on the metal passed between them.

In the process of rolling the blanks a bar of steel of a section suited to that of the blanks to be produced, and of the length requisite for any required number of blanks, is inserted between the rolls in one of the grooves D, and the rolls being in motion such bar is reduced to the required thickness of the blade, while portions of the metal are forced into the recesses or indentations E, thereby forming at suitable intervals the required bolsters or shoulders on the bar, which, upon leaving the rolls, will have assumed the form illustrated by Fig. 5. The bar thus formed is then cut up into lengths, each of which forms a blade or knife-blank, portions being cut away, as shown by the dotted lines at *c* in Fig. 5, in order to form the tang and point of the blade.

According to another modification of the rolls, as illustrated by Figs. 2, 3, and 4, in lieu of forming indentations in the bottom of the grooves, as in the modification hereinbefore described, we form longitudinal grooves E in the rolls, at a distance apart equal to the required distance of the bolsters to be formed on the bar to be rolled. The bar F, Fig. 2, from which the blanks are to be formed, is first rolled to an oval or other suitable section and size, according to the desired pattern of the bolsters to be produced, and is then passed between the rolls, which may be provided with grooves round their peripheries, as in the arrangement hereinbefore described, for the purpose of reducing the bar to the desired thickness of the blades; or the grooves D may be dispensed with, and the rolls arranged at a distance apart equal to the desired thickness of the blade.

The bar F, as it passes between the rolls, is flattened out by the smooth portion of the rolls, so as to form the blades and tangs, while the longitudinal grooves E being of sufficient depth to clear the thickness of the bar, portions of the said bar will be left at intervals uncompressed to form the bolsters, the size and shape of which will be regulated by the form or pattern of the longitudinal grooves.

The tangs may be either left flat, as shown at $d$ in Fig. 5, or made square, as shown at $e$ in Fig. 6; or they may be made of any other desired shape.

Having thus described our invention, what we claim, and desire to secure by Letters Patent of the United States, is—

1. The rolls A A, recessed and formed substantially as described, for producing blanks for table-cutlery, in the manner and for the purpose set forth.

2. A continuous series of the rough blanks for table-cutlery, rolled in one piece, with the bolsters or shoulders at regular intervals, and adapted to be cut up into lengths, substantially as and for the purposes herein shown and set forth.

CHARLES GRAY HALLAS. [L. S.]
F. W. FLOWER. [L. S.]
EDWARD PEARSON. [L. S.]

Witnesses:
W. W. WOODHEAD,
F. F. HIBBERT.